Patented July 18, 1950

2,515,515

UNITED STATES PATENT OFFICE 2,515,515

PHOTOCHEMICAL PREPARATION OF POLYPEPTIDES

David S. Kahn, Madison, Wis.

No Drawing. Application September 12, 1947, Serial No. 773,735

10 Claims. (Cl. 204—158)

The present invention relates generally to a process for synthesizing protein analogues and is more particularly directed to the photosynthesis of protein analogues or polypeptides.

In its broader aspects, the present invention utilizes ultraviolet light for activating, polarizing, or dissociating a

group of a generalized diketopiperazine in the presence of another

group of any peptide aggregation having free quaternary electrons on the nitrogen atom which nitrogen atom then forms a new carbon nitrogen bond with the carbon atom of the light activated group of the diketopiperazine, while the nitrogen of the first group bonds with the hydrogen of the second group.

The present process provides for the formation of protein analogues, i. e. of long chain compounds with or without sidechains which are polymers of the

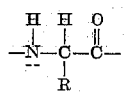

unit where R is any generalized substituent characteristic of alpha amino acids. The starting materials for the formation of the above high molecular weight protein analogues include a generalized diketopiperazine derived from simple condensation of alpha amino acids or from ring formation of the peptide chain due to its characteristic fluorescent reaction and either a peptide linkage as in glycyl glycine or any biologically active compound which functions to rupture the diketopiperazine ring to form some characteristic compound having available quaternary ammonium electrons on the nitrogen atom from the diketopiperazine initially light activated. It is emphasized, however, that subsequent growth of the peptide aggregation depends chiefly on the reaction between the light activated diketopiperazine ring and the

group generally present in any straight chain segment of a peptide.

The present invention utilizes particularly the activation of the before-mentioned carbon nitrogen bond by means of ultra-violet radiation. Such activation sets the carbon nitrogen bond into violent oscillation and substantially dissociates the bond and the carbon and nitrogen are each free to associate with or bond with other bondages immediately available in the solution. Thus when diketopiperazine and glycyl glycine are utilized as starting materials, the exposure of the solution to radiation in the range of 2500 to 3000 A° causes the activation of at least one of the

groups with respect to the carbon nitrogen bond in the diketopiperazine. This step is illustrated by the following:

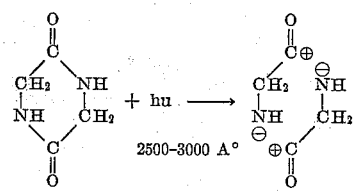

The above illustrates, as indicated by the ⊕ against the carbons and the ⊖ against the nitrogens that these atoms are substantially free to associate themselves with preferential atoms. In order to satisfy the activated carbon nitrogen bond, the present process uses any available

group in solution as that of glycyl glycine or any higher polypeptide.

The following illustrates one reaction between diketopiperazine and glycyl glycine:

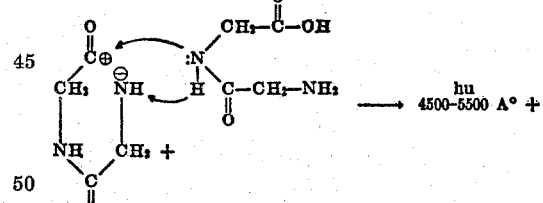

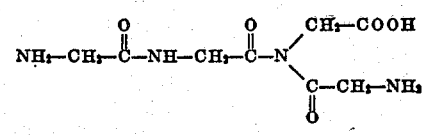

The above shows the unit process of the formation of the long chain high molecular weight protein analogues by the interaction of glycyl glycine with one polarized or activated carbon nitrogen bond in the diketopiperazine molecule. It will be understood that a similar reaction takes place in the other activated carbon nitrogen bond.

The nitrogen atoms supply the quaternary electrons to satisfy the activated or dissociated carbon of the diketopiperazine, and the extra hydrogen atom satisfies the negative charge on the N—H group.

The reaction of glycyl glycine with diketopiperazine may be generalized both with respect to the peptide aggregation and with respect to the diketopiperazine as follows:

(1) generalized straight chain peptide:

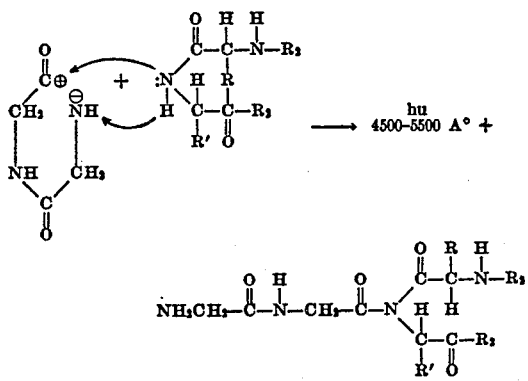

(2) generalized diketopiperazine, first type:

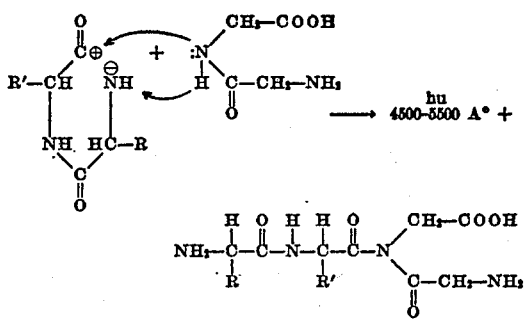

(3) generalized diketopiperazine, second type:

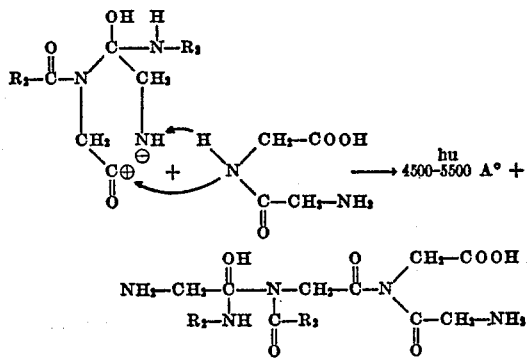

By $R_2$ is meant a generalized peptide aggregation or the continuation of the peptide chain. By R and R' is meant any generalized substituent attached in the alpha position similar to those found in amino acids of living organisms.

The above generalizations illustrate the reaction and product when only one of the carbon nitrogen bonds is polarized or activated in any given diketopiperazine molecule. Another such bond in another diketopiperazine ring may enter into the reaction in a similar manner with the existing reaction products. Thus, the protein analogue obtained becomes more complex and has a higher molecular weight.

The reaction of the present invention is applicable to all peptides of alpha-amino acids. The substituent groups that can be assigned to the alpha carbon atom are relatively irrelevant to the synthesis. No claim is here made about the reactivity of alpha amino acids neither of whose alpha substituents are hydrogen when used as diketopiperazines. But all alpha amino acids similar to those in living organisms are suitable for this reaction.

In the reaction, the C—N bond is activated by the ultraviolet light and the quaternary electron moves into a more stable orbit, fluorescing in doing so.

Insight into the generality of what constitutes a successful reaction mixture may be had from the following experiment: An aqueous solution of 0.5 gram of a mixture of diketopiperazine or glycine anhydride and 30 cc. of distilled water at 31° C. is irradiated with a source of ultraviolet light. Biuret tests made every twenty minutes for a period of two hours are to all appearances negative. The reaction mixture is then "seeded" with approximately 0.01 gram of urethane. At the first twenty minute check, the biuret test indicates the presence of polypeptides. In this modified form of the process urethane effects the decomposition of the light activated diketopiperazine to generate an aliphatic

group thereby providing in the solution, which originally contained only diketopiperazine, a mixture of diketopiperazine and an aliphatic

group and the photo-synthesis of polypeptides proceeds in the same manner as in the preferred form of the invention in which together with diketopiperazine an aliphatic compound containing the

group is provided as fully described earlier in this specification. However, it is within the generality of the invention described here because the first step generates a simple peptide group from which the macro molecule can grow.

The stated concentrations of diketopiperazine and urethane are merely illustrative. They may be varied widely over a wide range of concentrations independently of each other. The choice of urethane is illustrative too. In addition to urethane, it has been possible to accelerate this synthesis with thiamin hydrochloride, ascorbic acid, acetone, caffeine, saccharine, acetamide, veronal, and sodium carbonate. But these too are merely illustrative. However, these accelerating chemicals probably have one thing in common: they rupture the diketopiperazine ring, after which the reaction proceeds in the general manner already stated. In the present photosynthesis, the activation or dissociation of the C—N bond in the diketopiperazine with the consequent bonding of the carbon to the nitrogen of some other compound present in the solution takes place in a manner more or less independent of the concentration of the respective compounds or of the choice of accelerating chemicals.

The reaction proceeds without agitation, but agitation is beneficial. The pH may be varied from acid through neutral to alkaline. The wavelength of the ultraviolet light gives optimum results between 2500 A° to 3000 A°. Ultraviolet light in the range of 2000 A° to 2500 A° is also effective in the present synthesis. There may be wide variation in temperature, this synthesis having been run successfully at 30° C., 50° C. and 70° C. The duration of the irradiation will depend upon the method of exposure. Thus where large bodies of the solutions are exposed the exposure should be greater than when small quantities or thin flowing sheets of the solution are irradiated. The amount or duration of the irradiation may also depend upon the desired yield or concentration of the product. It may also vary with the concentration of the reacting ingredients.

The present invention will be best understood from the physical interpretation of the light absorption and fluorescent data of proteins and diketopiperazine. The activation energy of fluorescence can be shown to be 18.2 kilocalories per mole, comprising the quantized energy to energize the N—H bond sufficiently for diketopiperazine formation. From the protein absorption line at 4350 A° it is evident that the thermodynamic increment associated with the C—N bond is 47.5 kilocalories per mole. If we assume the physical significance of the 2500 A° line is the dissociation of both C—N bonds and the energizing of an N—H bond of a diketopiperazine formation in a peptide chain, the calculated absorption line is 2507 A°. This assumption is further borne out by the green fluoresence of diketopiperazine on light absorption, a phenomenon associated with C—N bond formation, and with the fact that polypeptide synthesis does take place under the previously mentioned experimental conditions. The mechanism, therefore, essentially comprises the activation or polarization of a C—N bond of a generalized diketopiperazine and the ensuing phenomenon of the quaternary electrons on the nitrogen atom of a peptide group moving into a more stable configuration (fluorescing in the process) by forming a new C—N bond. The formation of such a new bond is capable of repeating itself and forming an extended peptide configuration in space.

In the present process the

group of a diketopiperazine molecule is dissociated at the carbon nitrogen bond by ultraviolet light, and a new bond is formed between the polarized carbon atom of this molecule and the nitrogen (having free quaternary electrons) of a straight chain peptide group. The two molecules spoken of above may derive from different compounds or from the same compound. While as specifically illustrated above, the compounds of diketopiperazine and glycyl-glycine are employed, the building up of macromolecular proteins or polypeptides by photosynthesis as described herein may also be had by first hydrolising diketopiperazine and then subjecting the same to irradiation or if desired the hydrolysis and irradiation may take place simultaneously.

Thus generalized diketopiperazines may be employed and partially hydrolyzed so as to provide the requisite mixture for peptide synthesis. Conversely, glycyl glycine or larger peptide aggregations can be cyclized so as to form diketopiperazines, thus providing the requisite mixture for peptide synthesis. The process is facilitated by foreign agents to effect the decomposition of diketopiperazine so that an aliphatic

group be generated. These foreign agents may be selected from the following and similar materials and may comprise one or more of these materials: urethane, thiamin hydrochloride, ascorbic acid, acetone, caffeine, saccharine, acetamide, veronal and sodium carbonate.

The process of peptide synthesis takes place when two or more different compounds, one characteristically a diketopiperazine and the other a chain compound containing the

group, are irradiated in a water solution with ultraviolet light.

I claim:

1. The process of forming polypeptides comprising the steps of forming an aqueous solution of a substantial amount of two compounds, one a diketopiperazine and the other containing an aliphatic peptide

group, and subjecting the same to irradiation by ultraviolet light.

2. The process of forming polypeptides comprising the steps of forming an aqueous solution of a substantial amount of two compounds, one a diketopiperazine and the other containing an aliphatic peptide

group, and subjecting the same to irradiation by ultraviolet light in the range of 2500 A° to 3000 A°.

3. The process of forming polypeptides comprising the steps of forming an aqueous solution of a substantial amount of two compounds, one a diketopiperazine and the other glycyl glycine, and subjecting the same to irradiation by ultraviolet light.

4. The process of forming polypeptides comprising the steps of forming an aqueous solution of a substantial amount of two compounds, one a diketopiperazine and the other glycyl glycine, and subjecting the same to irradiation by ultraviolet light in the range of 2500 A° to 3000 A°.

5. The process of forming polypeptides comprising the steps of forming an aqueous solution of a substantial amount of a diketopiperazine, adding urethane to the solution, and subjecting the same to irradiation by ultraviolet light.

6. The process of forming polypeptides comprising the steps of forming an aqueous solution of a substantial amount of a diketopiperazine, adding thiamin hydrochloride, and irradiating the solution with ultraviolet light.

7. The process of forming polypeptides comprising the steps of forming an aqueous solution of a substantial amount of a diketopiperazine, adding ascorbic acid, and irradiating the solution with ultraviolet light.

8. The process of forming polypeptides comprising the steps of forming an aqueous solution of a substantial amount of a diketopiperazine, adding urethane to the solution, and subjecting the same to irradiation by ultraviolet light in the range of 2500 A°–3000 A°.

9. The process of forming polypeptides comprising the steps of forming an aqueous solution of a substantial amount of a diketopiperazine, adding thiamin hydrochloride, and irradiating the solution with ultraviolet light in the range of 2500 A°–3000 A°.

10. The process of forming polypeptides comprising the steps of forming an aqueous solution of a substantial amount of a diketopiperazine, adding ascorbic acid, and irradiating the solution with ultraviolet light in the range of 2500 A°–3000 A°.

DAVID S. KAHN.

REFERENCES CITED

The following references are of record in the file of this patent:

Aberhalden et al., Zeitschrift fur Physiologische Chemie, vol. 178 (1928), pp. 156–63.

Wrinch et al., Nature, vol. 138 (1936), pp. 758–9.

Kuzin et al., Biokhimiya, vol. 5, No. 1 (1940), pp. 86–92.

Lerman et al., Journal of General Chemistry, U. S. S. R., vol. 11 (1941), pp. 127–32.

Ellis et al., Chemical Action of Ultraviolet Rays (1941), pp. 670–80.

Journal of The Franklin Institute, July 1941, pp. 76–85.

Vles, Archives de Physique Biologique, vol. 16 (1943), pp. 137–66.